United States Patent [19]

Briar

[11] 3,937,070

[45] Feb. 10, 1976

[54] METHOD AND SENSORS FOR PREDETERMINING DYNAMIC MODULI IN SITU OF CASTABLE-TYPE MATERIAL

[75] Inventor: Herman P. Briar, Rancho Cordova, Calif.

[73] Assignee: Aerojet-General Corporation, El Monte, Calif.

[22] Filed: Apr. 29, 1974

[21] Appl. No.: 465,206

[52] U.S. Cl. .................................. 73/88 R; 310/8.3
[51] Int. Cl.² .......................................... G01L 1/16
[58] Field of Search ................ 73/88 R, 88.5 R, 89; 338/2, 6; 310/8.3

[56] References Cited
UNITED STATES PATENTS

| 3,205,464 | 9/1965 | Schwartz | 73/88.5 R X |
| 3,395,564 | 8/1968 | Rastrelli et al. | 338/2 X |

*Primary Examiner*—Jerry W. Myracle
*Attorney, Agent, or Firm*—Edward O. Ansell

[57] ABSTRACT

The method and sensors are capable of measuring dynamic moduli of nongaseous fluid and semi-fluid materials. When cast in a castable-type material, such as solid rocket propellant, changes due to chemical aging of the propellant or other substances being tested may be detected. The sensors include a spacer separating a pair of piezoelectric crystals with substantially no air gaps between the crystals. One of the crystals is driven while the other is connected to a recording device. The measured response of the sensor in-situ or immersed in a work sample is compared with the response in air. The elastic modulus and loss tangent of the tested material may be computed based upon the amplitude and phase of the sensor's response.

13 Claims, 10 Drawing Figures

FIG_1

FIG_2    FIG_3    FIG_5

FIG_4

FIG_6

FIG_8

FIG_7a

FIG_7b

FIG_7c

METHOD AND SENSORS FOR PREDETERMINING DYNAMIC MODULI IN SITU OF CASTABLE-TYPE MATERIAL

BACKGROUND OF THE INVENTION

1. Field of the Invention

The invention relates to the determination of dynamic response properties of fluid and semi-fluid materials. More particularly, it relates to a method and sensors which will determine these properties in situ of castable-type materials, such as rubbers and plastics, as well as pourable compositions.

2. Description of the Prior Art

In certain applications, it is desirable to determine hardening or the growth of voids or softening of a cast mass of a castable-type material. For example, any of the above changes in a cast mass of a propellant grain might lead to problems of the proper firing of motors containing such grains. Although many techniques are known for determining mechanical properties of a cast mass of particles or grains, such prior art techniques are relatively complex and must be carried out under laboratory conditions or the like.

During the storage period changes may occur in the propellant. Some propellants harden, some soften and others may harden for a while, then soften. In some instances, hardening of the propellant grain will cause failure at low temperature. In other instances, softening of the grain will cause excessive "slumping" of a standing propellant grain at higher temperatures and in still a third instance softening of the grain will reduce the resistance of the rocket to the pressures generated during firing. In other instances, the rocket motors are required to withstand dynamic loads during transportation and during firing. Changes in the properties of the propellant could affect the motor capability to withstand these required loads. Propellant movement due to imposed loads causes the grain to separate or debond at various locations which debonding can be detected by one or more properly located sensors. Thus, when it is necessary to fire the rocket motor, the presence of an undesirable amount of such separations may result in improper combustion of the propellant grain, as would the undetected presence of voids.

It is therefore desirable to test such rockets for any changes in the cast propellant prior to the time of firing such rockets.

Other compositions where properties are subject to change include urethane foams which degrade upon extended storage. It is therefore also desirable to determine the change in properties of such foams.

SUMMARY OF THE INVENTION

It is an object of this invention to provide a method for the determination of the dynamic mechanical properties of a nongaseous fluid or semifluid, pourable or castable material, such as a solid rocket propellant grain.

It is a further object of this invention to carry out the foregoing object in situ so that such property changes may be determined immediately up to the time of use of the material, as for example, propellant grains disposed in the chamber of rocket motors or the like and in structural plastic parts especially those which are subjected to potential detrimental aging effects, e.g., structural honeycomb.

It is still another object to provide sensors for carrying out the foregoing objects.

These and other objects are preferably accomplished by disposing a plurality of sensors at pre-spaced locations in the cast mass. The bending characteristics of the sensors are matched to the normal elastic properties of the material. Each of the sensors includes a spacer separating a pair of piezoelectric crystals with substantially no air gaps between the crystals. One of the crystals is driven while the other is connected to a suitable recording device. The dynamic properties of the mass are determined by the degree of bending of the sensors.

DESCRIPTION OF THE PREFERRED EMBODIMENT

Figure 1:
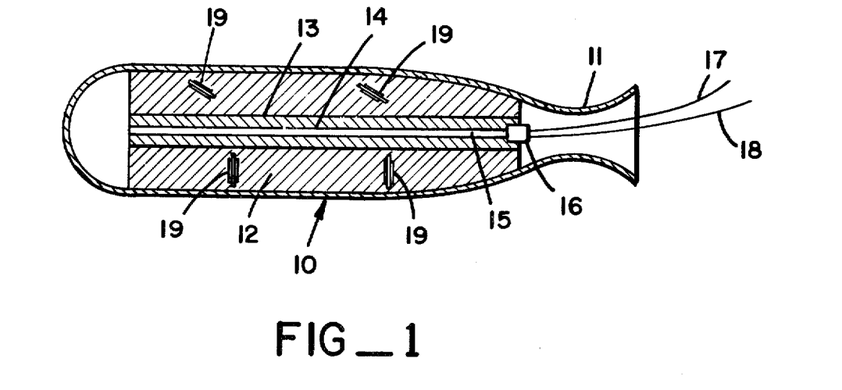
FIG. 1 is a cross-sectional elevation view of a cast mass of a propellant grain cast in situ in a rocket motor as an exemplary embodiment of the sensors and method of the invention.

Referring now to FIG. 1 of the drawing, in an exemplary embodiment of the invention, a rocket motor casing 10 is shown which may be generally tubular in configuration having an exit nozzle 11 at one end and closed at the forward end. A cast mass of a propellant grain 12 is disposed within casing 10, such mass preferably having a central cavity throughout its length as is well known in the rocket art. Grain 12 may be ignited in any suitable manner, such as by providing an igniter 13 in the form of a mass of an incendiary mixture 14 surrounding a length of an explosive connecting cord 15. In igniting arrangement with one end of cord 15 is an electric blasting cap 16, and leading from cap 16 are wires 17, 18 for igniting the same.

It is to be understood that the foregoing is merely one example of the confinement of a cast mass of a propellant grain in a rocket motor casing or the like. Further, the invention is not limited to the determination of the dynamic mechanical properties in a cast mass of a propellant grain but is applicable, where appropriate, to the determination of dynamic mechanical properties in a mass of any material which is capable of being cast and which material has a modulus capable of being matched to the bending stiffness of the sensor being utilized, as will be discussed further hereinbelow.

Figure 2:
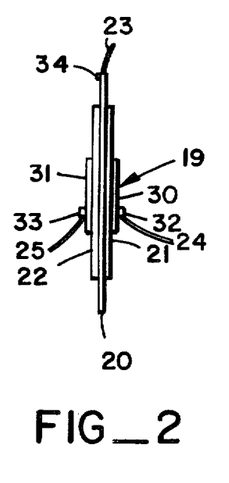
FIG. 2 is a side view of a sensor to be used to carry out the exemplary embodiment of the invention.
Figure 3:
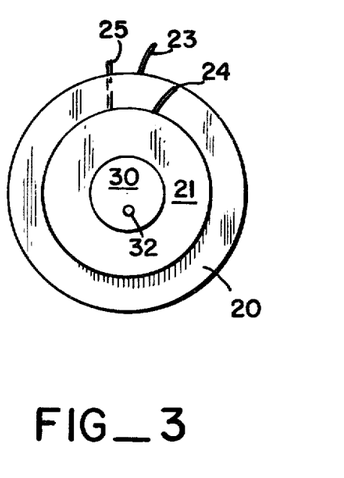
FIG. 3 is a vertical view of the sensor of FIG. 2.

Thus, referring now to FIGS. 2 and 3, as particularly contemplated within the present invention, sensing means are provided for sensing or determining dynamic properties in the propellant grain 12. In the exemplary embodiment, such sensing means includes one or more sensors 19, one of which is shown in FIGS. 2 and 3. Each sensor 19 includes a relatively thin spacer member which may be in the form of a spacer disc 20 sandwiched between a pair of relatively thin piezoelectric crystals discs 21, 22. Such discs 20 may be either nonconductive or conductive. Typical conductive materials employable include stainless steel, brass and silver. If nonconductive, disc 20 must have a conductive coating, now shown in the figures, superposed directly upon the nonconductive material on both the top and bottom surfaces. Typically the disc 20, whether having superimposed conductive layers thereupon or being conductive per se, is in the neighborhood of 2 to 10 one thousandths inch thick.

The planar faces of disc 20 are secured to mating planar faces of each disc 21, 22 in an air-tight manner, thus eliminating any air gaps between crystal discs 21 and 22. Although any suitable dimensions may be used for discs 20 – 22, preferably metallic disc 20 is greater in diameter than discs 21, 22 so as to electrostatically shield crystals discs 21 and 22 from each other. Discs 21, 22 are generally of the same diameter. For example, discs 20 – 22 may be about ½ to 1 inch in diameter with disc 20 slightly greater in diameter than discs 21, 22. Further, discs 21, 22 are preferably generally centrally located on disc 20. Of course, any suitable configuration may be used and members 20–22 need not be discs or even disc-like.

Superposed on the exterior surface of discs 21 and 22 are thin conductive layers, on an order of magnitude of 100 microns to about 1000 microns thick. Such superposed layers 30 and 31 may cover all or a portion of the exterior surface of crystals 21 and 22. The centerpoint of layers 30 and 31 preferably should coincide with, and correspond to, the centerpoint of crystals 21 and 22. Accordingly, the shape of the superposed layers may each be of a different shape from the other, and such shapes may differ from the shape of the crystals. Any conductive material which can be adhered to the crystal may be utilized. These include gold, silver, copper. Techniques for carrying out the adhesion of such conducting layer are known to the art.

Points 32, 33 and 34 are points of attachment for wires or other connectors to be utilized in the hookup of the sensors 19. As such, they are chosen at random on the exterior surface of the superposed layers and at some exposed location on the spacer member 20. As such, they do not appear in the sensor 19 as manufactured.

Preferably, discs 20 – 22 are relatively thin, the ratio of the thinness of disc 20 to discs 21, 22 depending upon the modulus of elasticity of the particular material being tested. For example, discs 20 – 22 may be on the order of about 0.002 to 0.01 inches thick. The thinness of spacer disc 20 to crystal discs 21, 22 may range from a ratio of 1:4:1 to 1:1:1; i.e., disc 22 to spacer 20 to disc 21. Conversely, this ratio may range from 4:1:4 to 1:1:1; i.e., disc 22 to spacer 20 to disc 21. Thus, spacer disc 20 may range from being generally equal in thickness to discs 21, 22 to being 1/100 the thickness of discs 21, 22 to four times the thickness thereof.

Finally, electrodes 23 through 25 are fixedly secured to each disc 20 through 22 and are adapted to be connected to ground and/or suitable control means as will be discussed further hereinbelow.

The sensing means further includes the use of a metallic disc 20 having a modulus of elasticity approximately two to three times that of the material comprising the crystal discs 21, 22. In an exemplary embodiment of the invention, the stiffness of disc 20 is substantially the same as the modulus of the propellant grain. Also, the composition of the material used in disc 20 must be such that it is insoluble in the matrix of the materials being tested, for example, the propellant grain. Disc 20 may be conductive or non-conductive. If non-conductive, disc 20 may be coated with a suitable conductive material so as to provide a conductive ground shield between discs 21 and 22.

The preferred modulus ratio of disc 20 to discs 21, 22 may be obtained by varying either the thickness of the discs 20 – 22 or the lateral dimensions thereof. Also, the flex capability of sensor 19 is matched to the flex capability of the matrix (e.g., the propellant grain) being tested. That is, the overall stiffness of sensor 19 is matched to the dynamic modulus of elasticity of the grain. For example, the crystal discs 21, 22 may have a modulus of elasticity of about 10 million psi whereas a stainless steel disc 20 may have a modulus of elasticity of about 30 million psi. The geometric mean modulus of the sensor 19 thus may be about 25 million psi. The modulus of elasticity of the propellant grain may be about one-half million psi. Any voids or differences from the consistency of the original material in the propellant grain or other pourable medium would be readily determined by flexing of sensor 19 as will be discussed further hereinbelow. The bending characteristics of sensor 19 is matched to the normal elastic properties of the propellant grain. The stiffness and the disc should also match that of the test material.

It is to be understood that the rocket motor casing 10 of FIG. 1 is generally stored in an upright manner, that is, with nozzle 11 at the bottom thereof preparatory to firing. However, such firing may not be carried out for a relatively long period of time, for example, over a number of years. During this storage period, the gravitational pull on the propellant grain 12 in the rocket motor casing 10 may result in the formation of a plurality of void spaces (hereinafter referred to as "voids") in the grain 12. These voids will soften the grain 12 and cause improper burning of the propellant grain 12 upon ignition thereof and is undesirable.

The overall stiffness of a given sensor 19 of this invention may be calculated according to the following formula I:

$$D = \frac{t_s^3 (E_s - E_z) + E_z t}{12 (1-V^2)}$$

where D is the overall stiffness of sensor 19, $t_s$ = the thickness of the material of the center spacer disc 20, $t$ is the total overall thickness of sensor 19, $E_s$ is the modulus of elasticity of the material of disc 20, $E_z$ = the modulus of elasticity of the piezoelectric material of crystal discs 21, 22, and $v$ is Poissons' ratio of the piezoelectric material of discs 21, 22. The materials being tested may include plastic, rubber and any fluid of a viscous nature. In addition, the sensors of this invention may be utilized in a cast aggregate such as concrete as in a dam structure, or roadbed, as well as in cast metallic objects. As to such special applications as in cast metals such as steel and aluminum objects, the limitation of utility of the measurement concept of this application is the slope of the curve relating measured output of voltage plotted against the subject material's property such as elastic modulus.

Consider E the modulus of elasticity of a tested material which may change over a wide range as the dynamic drive frequency is changed. As is known, this E actually consists of an elastic component and an inelastic component, namely E' and E'' respectively. Normalized gauge output is defined as the value of the measured voltage output from the material being tested divided by the value of the measured output for the sensor 19 in air under standard conditions. The phase angle theta may be defined as the angle whose tangent is E'' divided by E'. This angle theta is the phase shift between input and output voltages and is measured in degrees and minutes.

Figure 8:
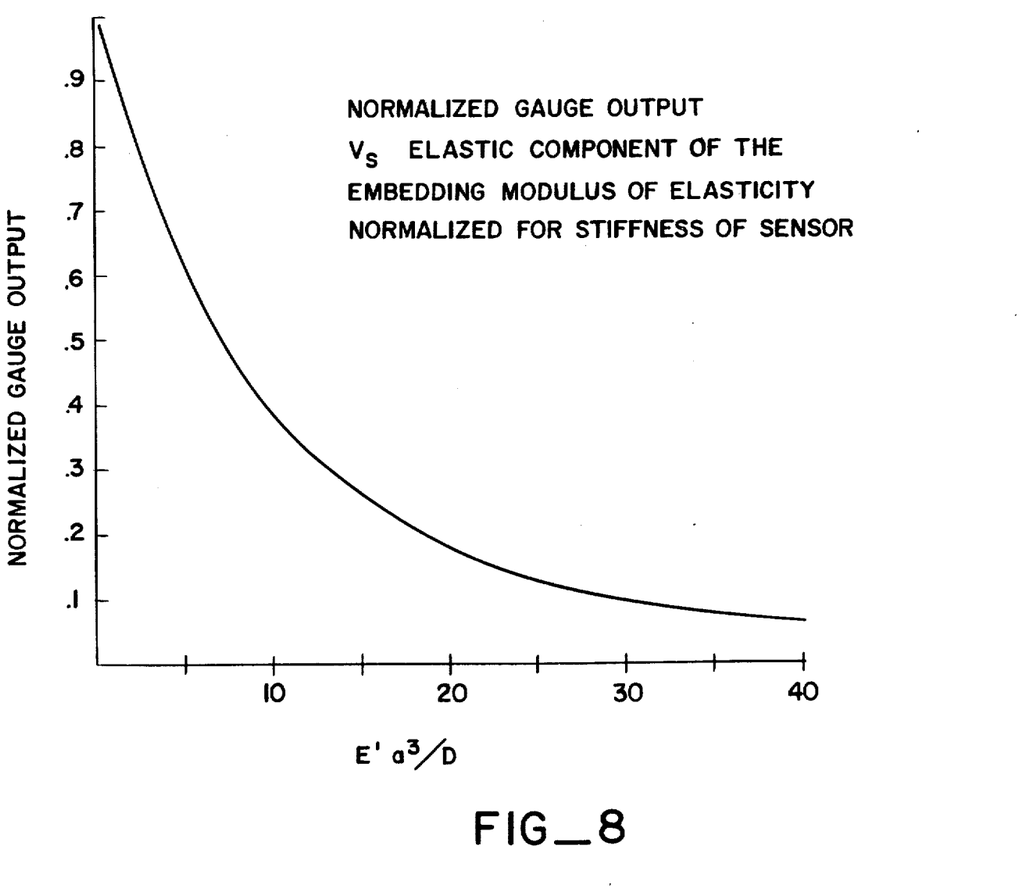
FIG. 8 is a graph showing normalized output voltage versus matrix stiffness for a sensor embedded in a material in accordance with the invention.

If a sensor stiffness "D" and a sensor diameter "a" are chosen such that the value of the formula $E' D/a^3$ is between 1 and 5, then the sensor 19 designed to give these values will be quite sensitive to changes in a limited region as illustrated in FIG. 8. Small changes in E' will cause large changes in gauge output because the slope is quite steep. On the other hand, if $E' D/a^3$ is large, the sensor 19 can measure modulus over a wide range but as E' becomes very large, the slope relating gauge output and modulus approaches zero. The continuing capability to measure properties (such as modulus) at various points along the curve is shown in FIG. 8. Here, a plot of normalized gauge output (i.e., the Y axis) is shown versus the elastic component of the embedding modulus of elasticity normalized for the stiffness of the sensor (i.e., the X axis). As the slope approaches zero, this capability is limited by the capability of state of the art sensing materials to make measurements. In addition, other limiting factors include the capability of amplifiers and recorders to amplify and record small changes in the sensor's output. For example, today, for a cast lead article, voltage ratio measurements expressed in parts per thousand would be required, while for a cast steel article, voltage ratio measurements in parts per 15,000 parts would be required for the same degree of accuracy. This is a 15:1 increase in measurement accuracy capability. Such increased accuracy is only available at substantially higher cost. Future technical advances in the peripheral equipment indicate the unlimited capability of the sensors and the method of the present inventions. Of course, in making internal measurements, the physical properties of the sensor material such as the Curie temperature, and melting point of the piezoelectric material, at the time of implantation of it into the material being cast should be taken into consideration.

Typical $E' D/a^3$ values near 1 allow the practioner to sense changes of about 1% with state of the art measuring equipment. If $E' D/a^3$ has a value between 10 and 20, modulus values between about 100 and about 5000 can be sensed to about ± 10% accuracy with such measuring equipment.

The greatest sensitivity over limited range can be attained by making $E' D/a^3$ between ½ and 5 while the widest measuring range at reduced accuracy can be obtained by making $E' D/a^3$ between 10 and 20.

Figure 6:
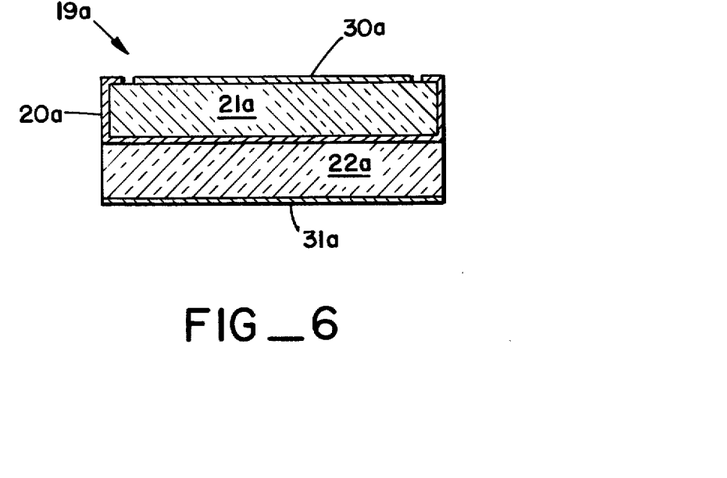
FIG. 6 is a side view of an alternative embodiment of a sensor within the scope of this invention.

Referring once again to FIG. 1, the invention contemplates the placing of a plurality of the sensors 19 of FIGS. 2, 3, and 6 at one or more spaced locations in the propellant grain 12. Although the particular number of sensors 19 and the placement thereof is arbitrary, a plurality of such sensors 19 should be placed within the propellant grain 12 at a sufficient number of locations therein to allow measurement of the desired dynamic properties throughout the entire volume of the item being measured. That is, these sensors 19 should be placed at a number of strategic locations so as to determine whether the dynamic response properties have reached some predetermined critical point at some predetermined time such as in the case of a rocket motor.

Referring once again to FIGS. 2 and 3, any suitable bonding means may be used for forming sensors 19. For example, epoxy resin may be used to secure discs 20 - 22 together, the resin then being cured in a vacuum bag at about 150°F while maintaining pressure on the discs 20 - 22 during the curing process to thereby force excess epoxy resin out between the discs and thereby eliminate air gaps between discs 21 and 22. For metals, diffusion, bonding and sputtering may be employed.

Figure 4:
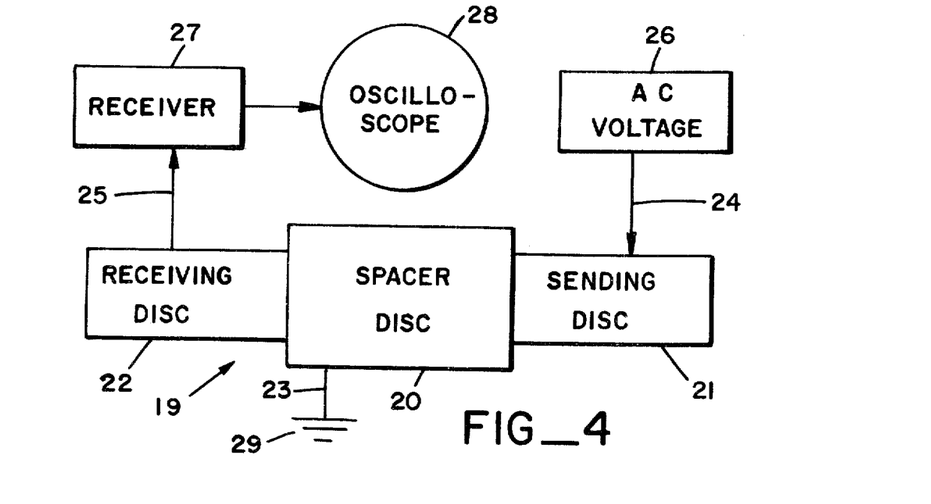
FIG. 4 is a diagrammatic view of one example of a circuit for carrying out the techniques of the invention.

Referring now to FIG. 4, one example of a circuit for carrying out the invention is disclosed. One side of sensor 19 may therefore be driven by a source 26 of A.C. voltage by connection to electrode 24 leading to sending crystal disc 21. The opposite side of sensor 19, i.e., receiving crystal disc 22, is connected via electrode 25 to a receiver 27, which may include an amplifier therein, operatively connected to a suitable recording device such as an oscilloscope 28. When voltage is applied to disc 21 via source 26, it bends, the degree of bending being dependent upon the mass of material (e.g., propellant grain 12) surrounding sensor 19. Disc 22 senses the degree of bending and records this information on oscilloscope 28. The electrode 23 leading from spacer disc 20 is connected to a ground 29. Any differences from the standard obtained from the material surrounding sensor 19 will be recorded on oscilloscope 28.

It can be seen from the foregoing that the techniques of my invention may be used to determine the dynamic properties in a pourable or castable-type material, such as a propellant grain, road bed, concrete dam or other structure. Thus, long term aging and surveillance processes may be carried out dynamically to police any degradation process that might take place in such materials.

Although sensors 19 may be placed in grain 12 in any suitable manner, generally the grain is a rubbery-like matrix that, when first cast, is fluid, then cured to obtain its final cast solid constituent. The sensors 19 would thus be inserted in the grain 12 during the casting process, or imbedded prior to final cure.

Alternatively, the sensors may be mechanically imbedded in the test material, and the disturbed test material is permitted to come to rest around the sensor as in the case of the river bottom mud as will be discussed below.

In propellant, one would attempt to determine the existence of voids or air spaces which arise either from improper casting, improper cure, during any aging period, or which arises from changes of the grain from its intended configurations.

Soft spots or hard spots that may arise at such prementioned time intervals are also determinable. Changes in the softness or hardness and voids are all measured as deviations from the measurements of standard test material.

Figure 5:
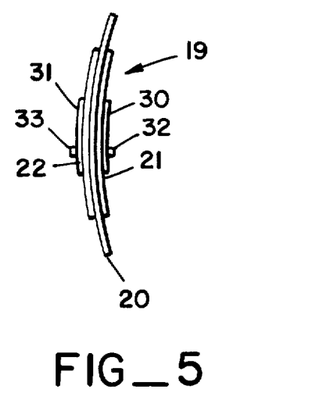
FIG. 5 is a side view of the sensor of FIG. 2 illustrating the bending effect thereon in accordance with the teachings of the invention.

FIG. 5 illustrates the bending of sensor 19 upon application of a voltage at the time of test. The degree of bending is exaggerated for convenience of illustration. Presence of a change of flex from the flex in standard material, i.e., the delta, is the indication of the presence of softness, hardness or voids. This is true for any test medium. This delta is recorded on oscilloscope 28.

FIG. 6 illustrates a sensor 19a of an alternative configuration wherein the spacer disc or member 20a is bent or otherwise formed around one of the sensing piezoelectric crystals, e.g. disc 21a. It is to be understood that there is to exist a gap between the edges of spacer member 20a and the superposed conducting layer 30a. This gap on each side is to be of a diameter magnitude with the range of about 1/20 to ¼ of the total layer surface diameter. This embodiment is more flexible than linear spacer member version of the same thickness. This bent around portion maintains the shielding required between the input and output. Disc 22a is bonded to member 20a and also includes a superposed conducting layer 31a. Layers 30a, 31a may be silver or the like and spacer member 20a may be any suitable metal as discussed above.

Figure 7A:
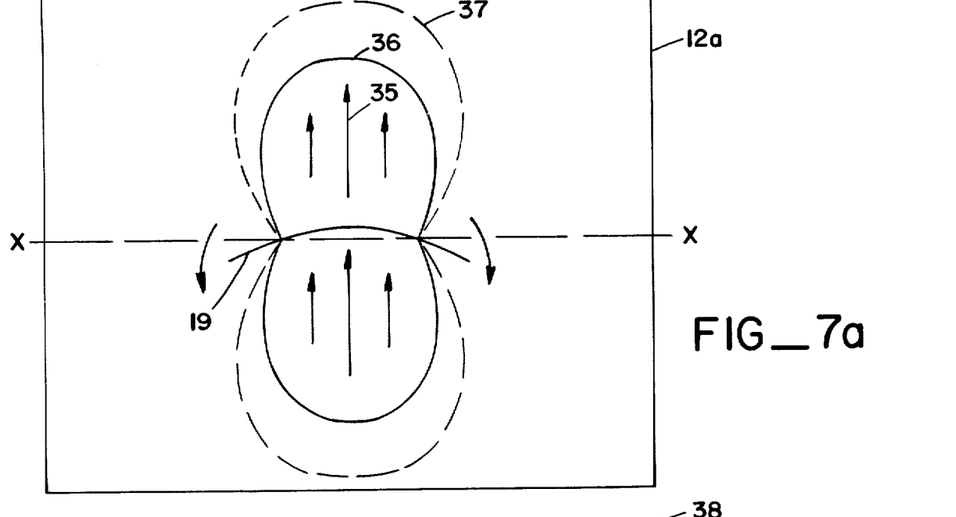
FIGS. 7a, 7b and 7c are schematic illustrations showing the flow patterns observed when a sensor of the instant invention is embedded in a matrix with variations in the peripheral area of influence upon the sensor.

FIG. 7a is a sketch of the flow patterns observed with a sensor 19 embedded in a clear rubbery photoelastic material 12a, such as Hysol 4485 (a urethane rubber with suitable stressoptic and mechanical properties) and observed between a polarizer and analyzer while voltages are applied with X—X being the zero flex point or neutral axis. It is observable that deformation in the material 12a occurs which are caused by the flex of the bending sensor 19a. The patterns show that deformation intensity falls off rapidly with distance from the sensor 19 and visually appears insignificant at about two sensor diameters from the sensor in either axial direction. The arrows 35 indicate the displacement with solid line 36 indicating a constant amount of strain at all points along line 36 and dashed line 37 indicating a degree of strain less than line 36.

Figure 7B:
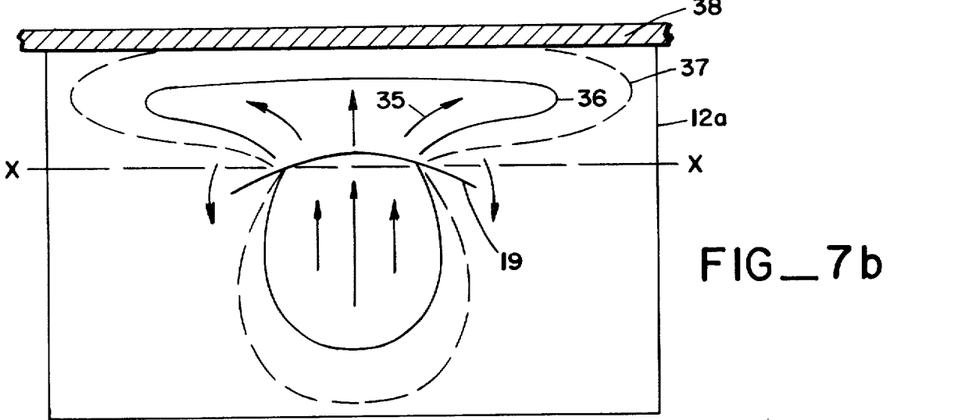

FIG. 7b is a sketch of sensor 19 embedded in material 12a near a rigid wall 38 such as near the case wall of rocket motor 10 wherein like numerals refer to like parts of FIG. 7a. The deformation patterns are modified by the rigid boundary of wall 38 and the total bending would be lessened from that shown in FIG. 7a.

Figure 7C:
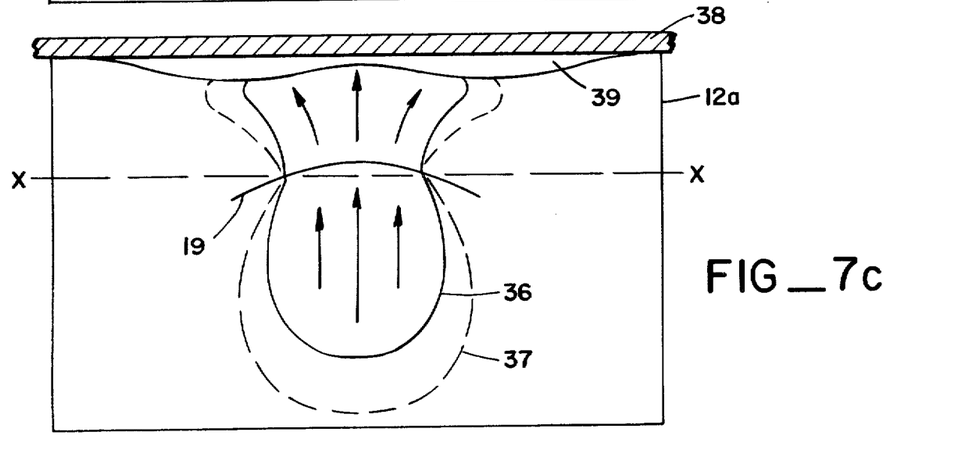

FIG. 7c shows the same situation depicted in FIG. 7b wherein like numerals refer to like parts but now an air separation 39 has developed between the rubbery material 12a and the rigid boundary of wall 38. Depending on the degree of separation 39, the deformation in this instance can exceed that shown in FIG. 7a since the sensor 19 has less material to deform on one side.

Thus, hardness or stiffness of material 12a is representative of the amount of cure. If a charge is first put on sensor 19, then again the same charge is put on later, comparison will tell if material 12a got harder or softer. If voids have developed, more deflection will be shown.

In summary, sensor 19 bends a differing amount from that amount of flex in the standard reference material due to variations in the hardness, softness or the presence of voids in the surrounding volume being tested. Although relatively thin discs 20 – 22 have been disclosed forming sensor 19, the thickness of these discs 20–22 may be varied. However, as the discs become thicker, the stiffness of sensor 19 would move away from the modulus of elasticity of the propellant grain or other substance under test. Preferably, therefore, sensor 19 is relatively thin.

While the flexibility of the sensor is directly related to the length of the spacer member for any given thickness thereof, if one were to reduce the diameter of the linear version spacer until it was equal to that of the crystals in an attempt to increase flexibility, one sacrifices the shielding required between the input and output portions of the apparatus.

The sensors 19 and 19a of this invention may be designed to optimize either sensitivity or measurement range. The optimization is related to dimensional relationships of the discs 20 and the two piezoelectric crystal discs 21, 22 as to the values of thickness diameter and modulus. These characteristics may be chosen and modified to suit the desired measurement capability. Thus, the parameter $D/a^3$ is used wherein D is a calculated number based on the Formula I hereinabove. As the value of $D/a^3$ increases, the potential measuring range increases, and sensitivity decreases, whereas if $D/a^3$ decreases, the measuring range is decreased and sensitivity is increased. Sensitivity means the capability to detect small incremental changes in the property being measured.

AC voltage measurements are made in situ and in air. This information and the phase angle between the input and the output voltage is fed to a computer whereby known relationships and dynamic properties may be determined.

It can be seen from the foregoing that a method and apparatus has been disclosed for the dynamic testing of a fluid or semi-fluid mass of material, such as a propellant grain, prior to utilization thereof.

The sensors of the instant invention and the method of detection associated therewith may be utilized not only to determine dynamic properties in cast materials within a predetermined configuration, but also for the determination of dynamic properties of unconfined masses wherein the periphery of such masses with respect to the radial volume of sensitivity of the sensor is additional unconfined mass. Thus it is possible to determine modulus and viscosity of viscous liquids as dependent upon and related to the amount of flex of the sensor.

An important new use for the method and apparatus of this invention is the in-situ testing of the dynamic properties of underwater gravel and earth to determine their capacity to support load bearing structures such as bridge piers, oil drilling platforms and the like, without the necessity of removing samples of material to be tested.

In addition, the sensors 19 and 19a of this invention may be utilized to detect changes in the properties of fluid materials. Thus, sensors 19 and 19a may be placed in a liquid medium, and determination made as to the gel capability of the liquid which would be indicated as a function of the flex of the sensor 19 or 19a. Change of state by freezing of a liquid to a solid may also be measured.

Of course, other modifications of the apparatus and method may occur to one skilled in the art and the invention is limited only to that described in the appended claims.

I claim:

1. A method for determining dynamic properties and changes in these dynamic properties with time in situ in a casted mass of a propellant grain comprising the steps of:

securely fastening a first planar face of a conductive member insoluble in said grain to a planar face of a first piezoelectric crystal having a modulus of elasticity between approximately one-half and one-third that of said conductive member in a manner eliminating substantially any air gaps between said abutting planar faces;

securely fastening a second planar face of said conductive member opposite said first planar face to a planar face of a second piezoelectric crystal having a modulus of elasticity between approximately one-half and one-third that of said conductive member in a manner eliminating substantially any air gaps between the abutting second planar face of said second crystal thereby forming a sensor;

securing a conductive layer on the exterior surfaces of each of said crystals;

depositing at least one of said sensors in said casted mass of propellant grain;

connecting said conductive member to ground;

applying a driving alternating voltage to the conductive layer of one of said crystals; and recording the voltage amplitude and phase at the conductive layer of the other of said crystals to thereby sense dynamic properties of said mass by the bending and phase relationships between input and output voltages of said sensor.

2. A method for determining changes and dynamic properties in situ in a pourable material including a plurality of sensors, each of said sensors having a conductive member insoluble in said material spaced between a pair of piezoelectric crystals with substantially no air gaps between said crystals, each of said crystals having a modulus of elasticity between approximately one-half and one-third that of said conductive member, each of said crystals having a conductive layer on their respective outer surfaces, the method comprising the steps of:

placing a plurality of said sensors at spaced locations in said material;

connecting said conductive member of each sensor to ground;

applying voltage to one of said conductive layers of one of said crystals of each sensor, and subsequently measuring any bending of said sensors by recording the voltage applied to the first of said crystals and voltage and phase with respect to input received at the other of said crystals.

3. A sensor for determining the dynamic properties of a castable material within which it is embedded comprising:

an electrically conductive spacing member of a material insoluble in said castable material and having a pair of opposed planar faces;

a first piezoelectric crystal having a modulus of elasticity between approximately one-half and one-third that of said spacing member secured to one of said planar faces of said spacing member in an air-tight manner and having a conductive layer on the other of its planar faces; and a second piezoelectric crystal having a modulus of elasticity between approximately one-half and one-third that of said spacing member secured to the other planar face of said spacing member in an air-tight manner and having a conductive layer on the other of its planar faces, the mean modulus of elasticity of said combined crystals and spacing member being substantially greater than the modulus of elasticity of said castable-type material.

4. The sensor of claim 3 wherein said spacing member and said crystals are relatively thin discs.

5. The sensor of claim 4 wherein said spacing member is slightly greater in overall diameter than said crystals, the diameter of said crystals being between about one-half and one inch, said crystals being generally centrally located on the planar faces of said spacing member.

6. The sensor of claim 5 wherein said discs are between about 0.005 to 0.01 inches in thicknesses.

7. The sensor of claim 6 wherein the ratio of the thickness of each said crystal to said spacing member ranges between about 1:1:1 to 1:4:1.

8. The sensor of claim 6 wherein the ratio of the thickness of each said crystal to said spacing member ranges between about 1:1:1 to 4:1:4.

9. The sensor of claim 5 wherein the stiffness of said sensor is determined from the following equation:

$$D = \frac{t_s^3 (E_s - E_z) + E_z t^3}{12 (1 - V^2)}$$

where:
$D$ = stiffness of sensor
$t_s$ = thickness of said spacing member
$t$ = overall thickness of said sensor
$E_s$ = Modulus of Elasticity of the material of said spacing member
$E_z$ = Modulus of Elasticity of the material of said crystals
$V$ = Poissons' ratio for said sensor.

10. The sensor of claim 5 wherein the greatest sensitivity of said sensor over a limited range may be obtained by making $E' D/a^3$ between about ½ and 5 whereas the widest measuring range at reduced accuracy may be obtained by making $E' D/a^3$ between 10 and 20 where:
$D$ = overall stiffness of said sensor;
$a$ = overall diameter of said sensor; and
$E'$ = the elastic component of E where E equals the nominal modulus of elasticity of the tested material.

11. The sensor of claim 3 wherein said spacing member is stainless steel.

12. The sensor of claim 3 wherein said spacing member is connected to ground, one of said crystals is connected to a source of A.C. voltage and the other of said crystals is connected to recording means capable of recording the degree of bending of the combination of said crystals and spacing member.

13. A method for predetermining dynamic moduli of castable-type material in-situ, comprising the steps of:

securely adhering a first planar face of a conductive member insoluble in said material to a planar face of a first piezoelectric crystal having a modulus of elasticity between approximately one-half and one-third that of said conductive member;

securely adhering a second planar face of said conductive member opposite said first planar face to a planar face of a second piezoelectric crystal having a modulus of elasticity between approximately one-half and one-third that of said conductive member;

securing a conductive layer with means for connection to an external electrical source or load to the opposite planar faces of each of said crystals;

securing a means for connection to an external ground to said conductive member;

curing said adhered conductive member with external connection means and said crystals with said conductive layers having external connection means, under vacuum at a temperature of about 150° F, while maintaining pressure on said crystals and said conductive member until substantially all air gaps are eliminated between said crystals;

arranging a castable-type material in the fluid state about said cured conductive member and crystals;

curing said castable-type material until its finally casted solid state;

connecting said conductive member external connection means to ground;

subsequently applying voltage to one of said conductive layers of one of said crystals through said electrical source connection means; and measuring any bending of said cured conductive member and crystals by recording the voltage applied to the first of said crystals, and recording through said load connection means the voltage and phase with respect to the input voltage as received at the other of said crystals.

* * * * *

UNITED STATES PATENT OFFICE
CERTIFICATE OF CORRECTION

PATENT NO. : 3,937,070
DATED : February 10, 1976
INVENTOR(S) : Herman P. Briar

It is certified that error appears in the above-identified patent and that said Letters Patent are hereby corrected as shown below:

In the Abstract

As last sentence of abstract, insert: --The invention herein described was made in the course of or under a contract with the Department of the Air Force.--

Claim 1, column 8, line 65, delete "casted" and insert --cast--.
Claim 1, column 9, line 16, delete "casted" and insert --cast--.

Signed and Sealed this fifteenth Day of June 1976

[SEAL]

Attest:

RUTH C. MASON
Attesting Officer

C. MARSHALL DANN
Commissioner of Patents and Trademarks